March 27, 1962 R. W. FISK 3,026,988
ARTICLE TRANSFER DEVICE
Filed April 6, 1959 4 Sheets-Sheet 1

INVENTOR
Robert W. Fisk

BY
Mead, Browne, Schuyler & Beveridge
ATTORNEYS

March 27, 1962  R. W. FISK  3,026,988
ARTICLE TRANSFER DEVICE
Filed April 6, 1959  4 Sheets-Sheet 2
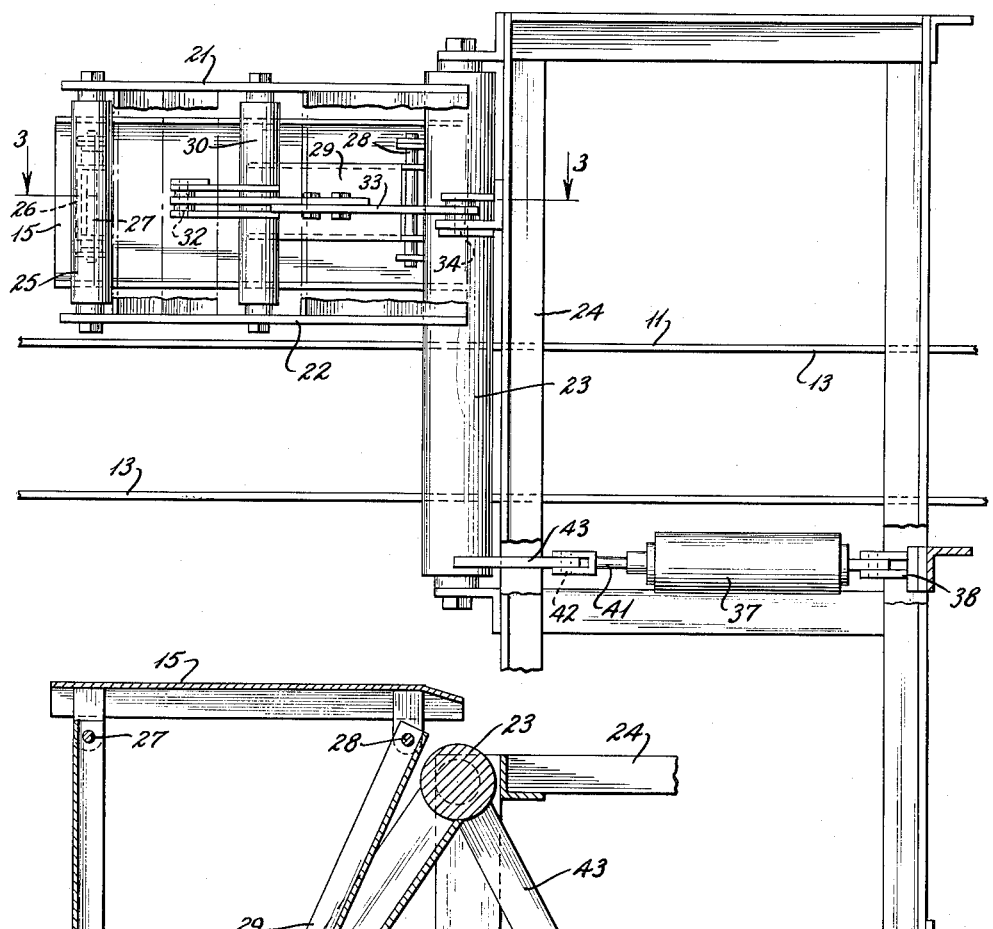
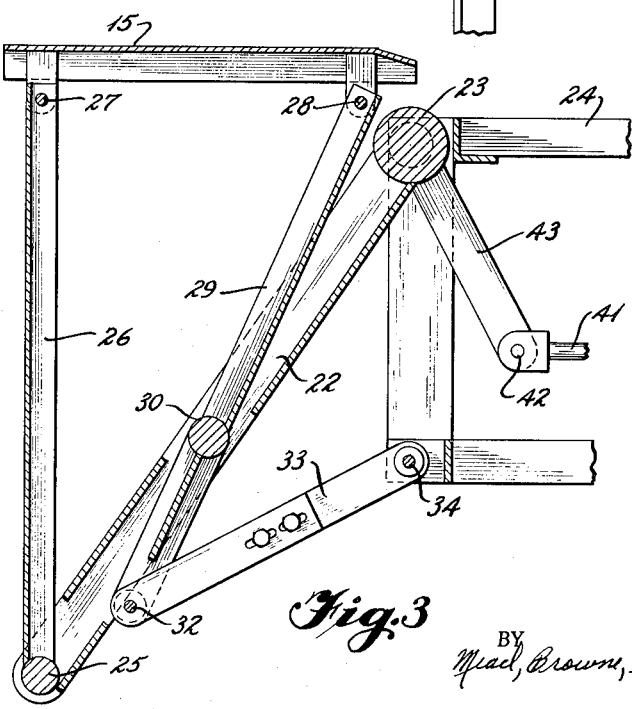
INVENTOR
Robert W. Fisk
BY Mead, Browne, Schuyler & Beveridge
ATTORNEYS March 27, 1962 R. W. FISK 3,026,988
ARTICLE TRANSFER DEVICE
Filed April 6, 1959 4 Sheets-Sheet 3

Fig. 4

INVENTOR
Robert W. Fisk

BY
Mead, Brown, Schuyler & Beveridge
ATTORNEYS

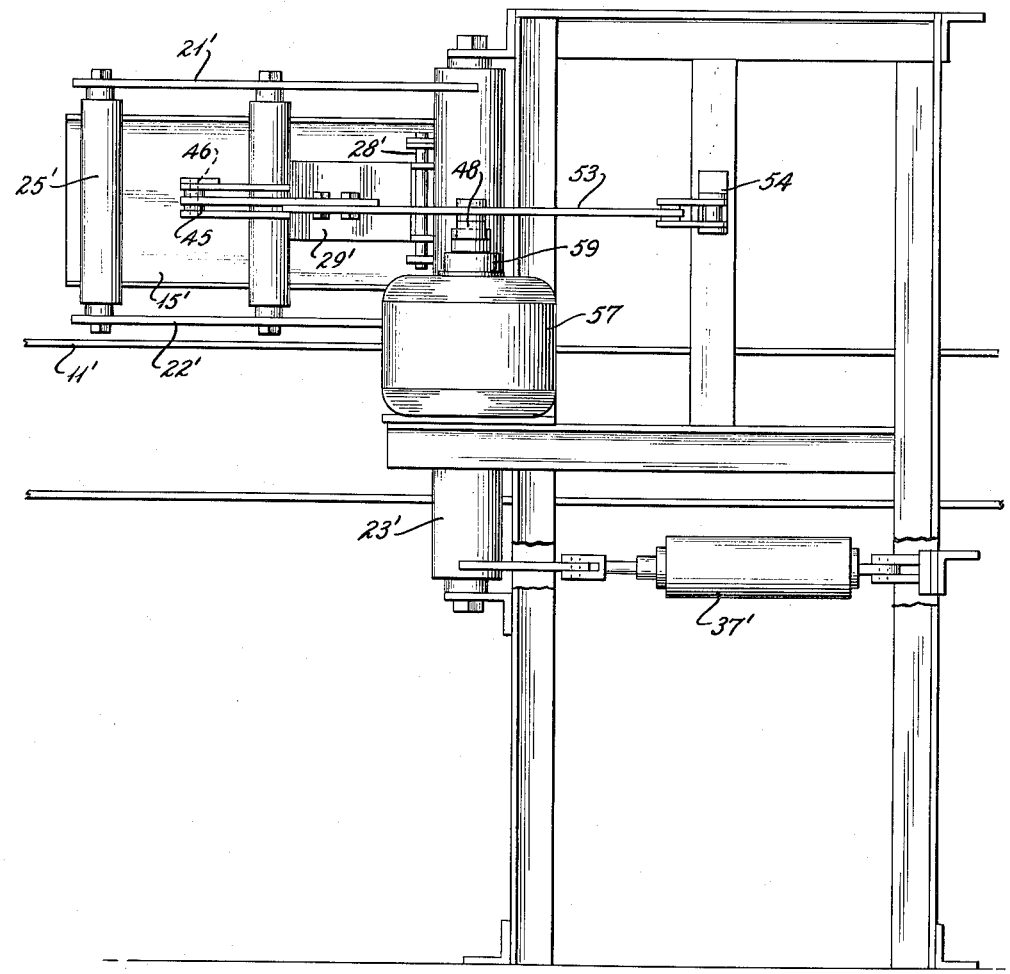

United States Patent Office 3,026,988
Patented Mar. 27, 1962

3,026,988
ARTICLE TRANSFER DEVICE
Robert W. Fisk, Sunnyvale, Calif., assignor to Mathews Conveyer Company, Ellwood City, Pa., a corporation of Pennsylvania
Filed Apr. 6, 1959, Ser. No. 804,440
6 Claims. (Cl. 198—24)

This invention relates to apparatus for shifting an article laterally from a conveyer and particularly concerns apparatus for engaging an article being moved along the surface of a conveyer and shifting the article toward one side of the conveyer while angularly orienting the article.

Transfer of articles moving along a conveyer to lateral branches has heretofore been accomplished by pushers moving transversely across the conveyer to engage and shift an article onto a lateral conveyer or by deflectors angularly disposed across the conveyer for guiding an article toward one side of the conveyer and onto a lateral conveyer.

Since conventional pushers must move across the conveyer and return, articles moving along the conveyer must be spaced sufficiently to afford time for the forward and return strokes of the pusher. Acceleration of articles by the pusher may result in overturning unstable articles. Even in the case of rapidly moving pushers articles must slide along the face of the pusher as they move longitudinally of the main conveyer and are pushed toward a lateral conveyer.

A deflector angularly disposed across the main conveyer to engage and deflect an article onto a lateral conveyer has the advantage of being quickly moved to and from an operative position. However, where angular orientation of the article on the lateral conveyer is important, a deflector is not reliable to correctly angularly position an article as it is moved to a lateral conveyer. Uniform angular alignment of articles on the lateral conveyers may be required for a number of purposes such as alignment of the flaps of the cartons to enter a sealing machine. Ordinarily a deflector is intended to engage the forwardmost surface of an article and turn the article as the article moves itself toward one side of the conveyer. The leading surface of the article is ordinarily turned away from the lateral conveyer. However, if an article is angularly disposed as it moves along the conveyer, the deflector may engage a side surface and actually turn the article in the wrong direction.

It is a major object of this invention to provide a device for positively discharging articles laterally from a conveyer in correct angular positions without impeding progress of other articles along the conveyer.

More particularly, an object of this invention is to provide an article shifting device which moves with an article along the conveyer while at the same time shifting the article transversely of the conveyer and turning the article to a correct angular position.

In the attainment of these objects, an important feature of the invention resides in the arrangement of an article engaging member normally disposed in a retracted position at one side of the conveyer with mechanism for moving the member with an article longitudinally of the conveyer and at the same time shifting the member transversely of the conveyer toward a lateral conveyer. During this combined movement longitudinally and transversely of the conveyer, the member is turned angularly to turn an article positively through an angle so it is discharged in correct angular position onto a lateral conveyer.

Another feature embodied in one form of the invention resides in movement of the article engaging member in an orbital path from a retracted position at one side of the conveyer downstream and across the conveyer to an extended position angularly disposed above the conveyer and then downstream and to the one side of the conveyer so it will not interfere with following articles, the member then being returned to its retracted position at the one side of the conveyer.

Other advantages and features of the invention will become apparent from the following specification in conjunction with the accompanying drawings wherein:

FIG. 2 is a vertical section taken along the lines 2—2 of FIG. 1;

FIG. 3 is a horizontal section taken along the lines 3—3 of FIG. 2;

FIG. 4 is a plan view showing a modified form of the invention; and

FIG. 5 is a section taken on the lines 5—5 of FIG. 4.

Figure 1:
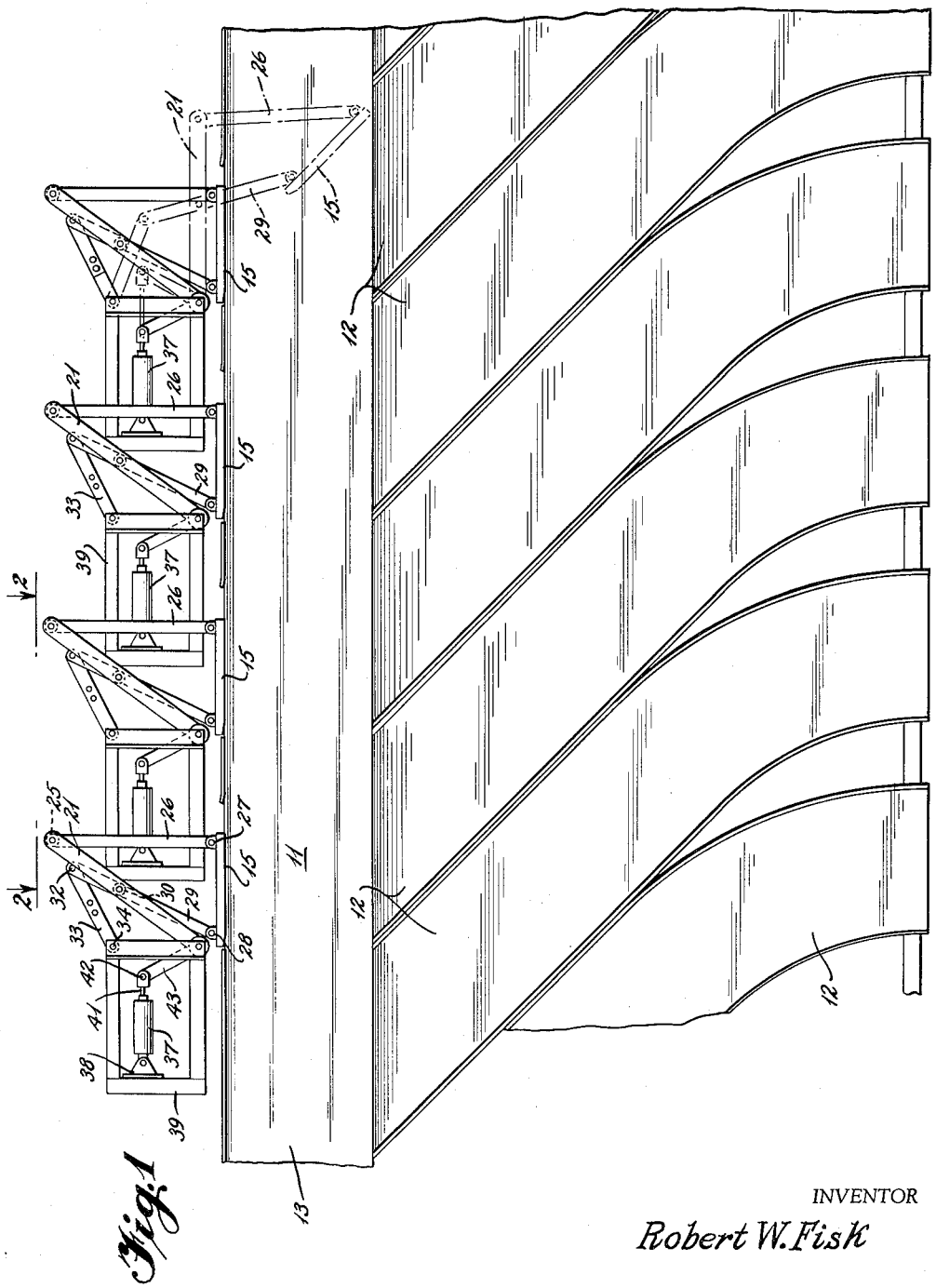
FIG. 1 is a plan view of a section of a conveyer showing a preferred form of the invention.

As illustrated in FIG. 1, articles moving along the conveyer surface 11 are to be turned 90° and discharged onto any one of a plurality of lateral conveyers 12, 12. In the form illustrated, conveyer 11 has an endless belt 13 for moving articles past several lateral receiving conveyers. Transfer of articles to the lateral conveyers is effected by selective operation of one of several transfer devices adjacent the conveyer. Proper alignment of the articles on the lateral conveyers may be required for a number of purposes such as alignment of the flaps of cartons to enter a sealing machine.

For the purpose of effecting proper transfer and angular orientation of the articles, each transfer device has an article engaging member 15 normally disposed in a retracted position at one side of the conveyer 11. To transfer an article onto a lateral conveyer 12 article engaging member 15 is simultaneously moved longitudinally of the conveyer in the direction of travel of the article and transversely of the cenveyer toward the other side of the conveyer while being turned angularly. It is thus located in an extended position as indicated in dotted lines in FIG. 1.

To manipulate articles engaging member 15 in this manner, a pair of arms 21 and 22 project from a rotatable member 23 mounted on a vertical frame member 24 at one side of the conveyer 11. At the free ends of the arms 21 and 22 is a rotatable member 25 carrying a link 26 which has its free end pivotally coupled as by pin 27 to one end of article engaging member 15. Spaced from the pivot pin 27 on the article engaging member is another pivot pin 28 coupling the free end of a lever 29 to the article engaging member 15. Lever 29 is supported by a rotatable member 30 mounted at an intermediate point of arms 21 and 22. With this arrangement, movement of arms 21 and 22 about pivot 23 shifts article engaging member 15 transversely across the conveyer 11 and at the same time angularly turns member 15 about a vertical axis. In order to move the member 15 longitudinally of the conveyer with the article it engages, lever 29 has its inner end pivotally connected at 32 to one end of an adjustable guiding link 33 of adjustable length, the other end of which is connected to a pivot 34 fixed on a frame member 24.

Operation of the linkage mechanism is effected by an air cylinder 37 supported at 38 on frame member 39 and having its piston rod 41 coupled at 42 to a crank 43 projecting from rotatable member 23.

When air is introduced into cylinder 37, operation of piston rod 41 turns member 23 and arms 21 and 22 toward the conveyer. At the same time, guiding link 33 causes lever 29 to turn about its fulcrum 30 and moves the article engaging member 15 longitudinally downstream of the conveyer. Flow of air to cylinder 37 may be controlled so member 15 moves along the conveyer at about the same speed as an article on the conveyer. At the same time, turning of arms 21 and 22 moves the article engaging member 15 transversely of the conveyer to shift the article toward the opposite side for discharge onto one of the lateral conveyers 12. Turning of the article is effected by turning movement of article engaging member 15 to an angle of approximately 45° with respect to the conveyer 11. Since the member 15 engages a side of the article, the article is positively rotated to correct angular position as it is discharged from the conveyer 11.

In the modifications shown in FIGS. 4 and 5 article engaging member 15' is moved in an orbital path from a retracted position disposed at one side of the conveyer longitudinally in the direction of movement of articles on the conveyer 11' and transversely across the conveyer to its extended position angularly disposed with respect to the longitudinal axis of the conveyer. After an article is moved onto a lateral conveyer 12', article engaging member 15' continues to move longitudinally of the conveyer in the direction of travel of articles while being retracted transversely toward the side of the conveyer. When retracted from the path of articles to the side of the conveyer the member 15' is moved along the side of the conveyer in an upstream direction until it reaches its fully retracted position.

This manipulation of the article engaging member 15' is accomplished by modification of the operating mechanism heretofore described. Arms 21' and 22' project from rotatable member 23' and carry a rotatable member 25' from which projects a link 26' pivotally connected at 27' to the article engaging member 15'. At the other end of member 15' lever 29' is pivoted at 28'. Lever 29' has a fulcrum 30' at a mid-point of the arms 21' and 22'. Manipulation of the lever 29' causes movement of the member 15' in an orbital path as described. This is accomplished by moving the free end 45 of lever 29' in an elliptical path as the arms 21' and 22' are rotated about pivot 23'. Free end 45 of lever 29' is pivoted at 46 to a lever 47 which is manipulated by rotation of a crank 48 about an axis 49. Crank 48 is pivotally connected to lever 47 at 51 and the other end of lever 47 has a floating pivotal connection 52 to a link 53 secured to fixed pivot 54 on the frame of the machine.

When an article is to be transferred from the surface of conveyer 11' onto lateral conveyer 12', air cylinder 37' is operated to turn the arms 21' and 22' about the axis of rotatable member 23'. Simultaneously shaft 49 on which crank 48 is mounted is rotated clockwise as viewed in FIG. 4 as by motor 57. This causes initial movement of article engaging member 15' from its retracted position at one side of the conveyer longitudinally in the direction of movement of articles on the conveyer 11' and transversely of the conveyer toward the lateral conveyer 12'. At the same time, article engaging member 15' is rotated angularly to correctly orient articles by engaging their side surfaces and turning them through an angle for proper alignment with lateral conveyer 12'. After the article is discharged onto conveyer 12', article engaging member 15' continues its orbital movement in the direction of travel of the articles on conveyer 11' and is moved transversely toward the first side of the conveyer until the article engaging member clears the side of conveyer 11'. Then, the orbit is completed by shifting the article engaging member 15' along the side of the conveyer 11' to its initial retracted position.

With this arrangement, articles may follow one another closely along the conveyer 11' because the article engaging member 15' continues to move downstream of the conveyer 11' after it has dispatched an article onto a lateral conveyer 12'.

Control of air cylinder 37' and motor 52 may be effected in any suitable manner to simultaneously initiate operation of the air cylinder and motor; reverse the air cylinder when article engaging member reaches the far side of conveyer 11' while continuing operation of motor 57; and stop motor 57 when the air cylinder is fully retracted. Speed of motor 57 is adjusted so crank 48, which is rotated through a reduction gear 59, is turned through one complete revolution during forward and reverse operation of air cylinder 37'.

As employed in the following claims, the term "down stream" defines movement in the same direction in which articles move along the conveyer while the term "up stream" defines movement in a direction opposite to the direction of movement of articles along the conveyer.

Having thus described apparatus illustrative of preferred modified forms of the invention, what is claimed as my invention is:

1. Apparatus for orienting and transversely discharging an article moving in a normal path of movement longitudinally along a conveyer comprising an article engaging member normally disposed in a retracted position at one side of the conveyer, a mechanism for moving said member simultaneously downstream with an article moving along the conveyer and transversely of the conveyer to shift the article to the other side of the conveyer while horizontally turning the member away from said normal path to angularly orient the article when it reaches the other side of the conveyer.

2. Apparatus for orienting and transversely discharging an article moving along a conveyer in a normal path of movement comprising an article engaging member, means for moving said member in a path extending downstream along and transversely across the conveyer, and means on said moving means for turning the member during movement along the last mentioned path to direct an article engaged by said member into a discharge path diverging from said normal path.

3. Apparatus for orienting and transversely discharging an article moving in a normal path of movement longitudinally along a conveyer comprising an article engaging member normally located at one side of said conveyer and extending parallel to said normal path, and means for moving said member from said retracted position in an orbital path extending downstream toward the other side of the conveyer to an extended position overlying said conveyer and angularly diverging from said normal path toward said other side of said conveyer and downstream toward said one side of the conveyer away from the article and then upstream to said retracted position.

4. Apparatus for orienting and transversely discharging an article moving in a normal path of movement longitudinally along a conveyer comprising an elongate article engaging member, means supporting said member in a retracted position extending parallel to said normal path at one side of the conveyer, and means operable in a first condition to move said member from said retracted position downstream toward the other side of the conveyer while turning said member horizontally to an extended position wherein said member angularly diverges from said normal path toward said other side of said conveyer, the last mentioned means being operable in a second condition to return said member from said extended position to said retracted position.

5. Apparatus for orienting and transversely discharging an article moving in a normal path of movement longitudinally along a conveyer comprising an elongate article engaging member normally located in a retracted position extending parallel to said normal path at one side of said conveyer, means for moving said member from said retracted position downstream in engagement with an article moving along the conveyer and concurrently moving said member toward the other side of the conveyer to shift the article laterally of the conveyer while turning said member horizontally to turn the engaged article into a discharge path diverging from said normal path toward said other side of said conveyer, said means then moving said member along said orbital path downstream toward said one side of the conveyer away from the article and then upstream to said retracted position.

6. Apparatus for orienting and transversely discharging an article moving in a normal path of movement longitudinally along a conveyer comprising an arm pivoted at one side of the conveyer to turn about a vertical axis, links pivotally connected to said arm, an article engaging member pivotally connected to said links, means for turning said arm to move said member toward said conveyer, and means for manipulating said links to shift said member longitudinally of the conveyer in the direction of movement of the article to an extended position overlying said conveyer wherein said arm diverges angularly from said normal path of movement toward the other side of said conveyer.

References Cited in the file of this patent

UNITED STATES PATENTS

| | | |
|---|---|---|
| 1,760,030 | Alger | May 27, 1930 |
| 2,601,914 | Davies | July 1, 1952 |
| 2,724,483 | Rose | Nov. 22, 1955 |